O. M. POND.
Cultivators.
No. 137,094.  Patented March 25, 1873.
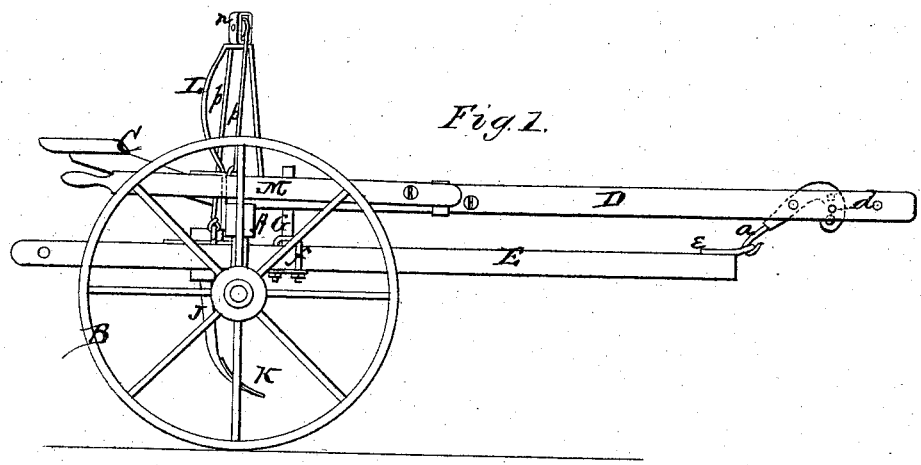
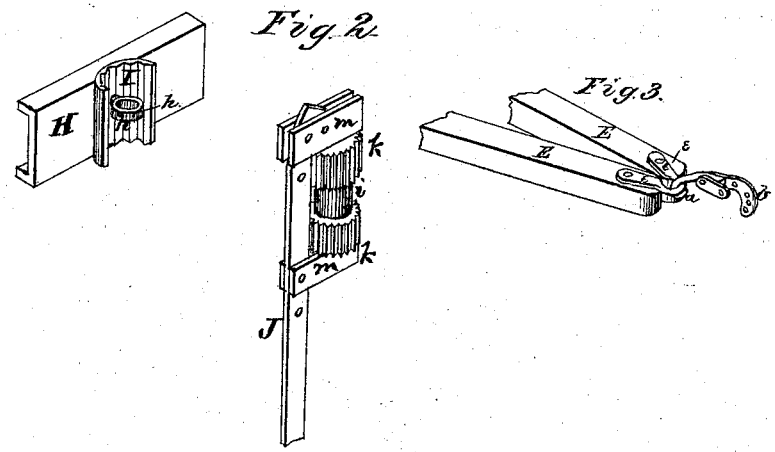
Witnesses
John A. Ellis
Wm K. Ellis
Inventor
Orlando M. Pond
Per,
T. N. Alexander & Co
Attys.

UNITED STATES PATENT OFFICE.

ORLANDO M. POND, OF INDEPENDENCE, IOWA.

IMPROVEMENT IN CULTIVATORS.

Specification forming part of Letters Patent No. 137,094, dated March 25, 1873.

*To all whom it may concern:*

Be it known that I, ORLANDO M. POND, of Independence, in the county of Buchanan and State of Iowa, have invented certain new and useful Improvements in Riding Corn-Cultivators; and I do hereby declare that the following is a full, clear, and exact description thereof, reference being had to the accompanying drawing and to the letters of reference marked thereon which form a part of this specification.

The nature of my invention consists in the construction and arrangement of a riding corn-cultivator, as will be hereinafter more fully set forth.

In order to enable others skilled in the art to which my invention appertains to make and use the same, I will now proceed to describe its construction and operation, referring to the annexed drawing, in which—

Figure 1 is a side elevation of a machine embodying my invention. Fig. 2 is a view of the standard-fastener, and Fig. 3 is a perspective view of the front part of the beams and attachment.

A represents the axle, to each end of which is secured a spindle for the wheel B. To the axle A is secured the driver's seat C. On the upper side of the axle A, a suitable distance from each end, is secured the rear end of a beam, D, and the front ends of said two beams are connected close together, forming a triangular or V-shaped frame, to which the team is attached as to a tongue. Between the front ends of the beams D D is pivoted a metallic hook, $a$, to which the shovel-beams E E are connected. The front or pivoted end of this hook is forked, one prong, $b$, being circular and extending in front of the other. In the prong $b$ are several holes, through which a bolt, $d$, passes, to fasten the hook rigidly to the beam. By removing this bolt the hook may be raised or lowered at will for the purpose of causing the shovels to run deep or shallow, as desired. The shovel-beams E are connected at their front end by an iron, $e$, into which the hook $a$ fastens; and the rear ends of said beams are held at any desired distance apart by means of a metallic bow, G, the ends of which are fastened to the shovel-beams by clamps $f$. To the inner side of each beam is attached one or more flanged plates, H, each having a concave piece, I, formed upon it. The concave surface of this piece is ratcheted or corrugated longitudinally, as shown. The plate H, with concave piece I, is fastened to the beam by an eyebolt, $h$, secured by a nut on the outside of the beam. Through the eye of the bolt $h$ passes a short shaft, $i$, upon which are secured two ratchet-pinions, $k$ $k$, one immediately above and the other immediately below said eye, so as to mesh with the corrugations on the piece I. To each end of this shaft is secured a clamp, $m$, in the lower one of which is pivoted the shovel-arm J, said arm being held in the upper clamp by a wooden pin, so that when the shovel K attached to the lower end of the arm strikes an obstruction said pin will break and allow the arm to turn on its pivot, and prevent any injury to any part of the cultivator. By this ratchet connection the shovel may be turned and held firmly in any desired position. In the shovel-arm there may be more than one hole for pivoting the same, so that it can be raised or lowered, if desired. The rear end of each beam D is connected with the axle by means of an iron frame, L, which extends upward, as shown, and has on its upper end a pulley, $n$. Over this pulley passes a chain, $p$, one end of which is attached to the shovel-beam E on that side, and the other end to a spring-lever, M, pivoted on the outer side of the beam D. The lever M is provided with a metal plate, which catches in ratchet-teeth formed on the frame L. By these means the shovels may be raised and lowered at will, and held at any height desired.

Having thus fully described my invention, what I claim as new, and desire to secure by Letters Patent, is—

1. The forked hook $a$ with projecting circular prong $b$ to form an adjustable connection between the tongue D and shovel-beams E, substantially as herein set forth.

2. The combination of the flanged plate H, concave ratchet-piece I, eyebolt $h$, and shaft $i$ with ratchet-pinions $k$ $k$, to which the clamps for holding the shovel-arm are attached, substantially as and for the purposes herein set forth.

In testimony that I claim the foregoing as my own I affix my signature in presence of two witnesses.

ORLANDO M. POND.

Witnesses:
J. P. SAMPSON,
J. W. GETCHELL.